US006643248B2

(12) United States Patent
Naberhuis et al.

(10) Patent No.: US 6,643,248 B2
(45) Date of Patent: Nov. 4, 2003

(54) DATA STORAGE DEVICE

(75) Inventors: Steven L. Naberhuis, Fremont, CA (US); Huei-Pei Kuo, Cupertino, CA (US); Si-Ty Lam, Pleasanton, CA (US); Henryk Birecki, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 365 days.

(21) Appl. No.: 09/836,124

(22) Filed: Apr. 16, 2001

(65) Prior Publication Data

US 2002/0150021 A1 Oct. 17, 2002

(51) Int. Cl.[7] .................................. G11B 7/00
(52) U.S. Cl. ................ 369/126; 369/101; 365/118
(58) Field of Search .................. 369/101, 126, 369/275.1, 275.2; 365/118, 217, 128, 151; 250/306, 307

(56) References Cited

U.S. PATENT DOCUMENTS 5,557,596 A     9/1996   Gibson et al. .............. 369/101
6,473,388 B1 * 10/2002   Gibson ........................ 369/126

* cited by examiner

Primary Examiner—Muhammed Edun

(57) ABSTRACT

The present disclosure relates to a data storage device, comprising a plurality of electron emitters adapted to emit electron beams, the electron emitters each having a planar emission surface, and a storage medium in proximity to the electron emitter, the storage medium having a plurality of storage areas that are capable of at least two distinct states that represent data, the state of the storage areas being changeable in response to bombardment by electron beams emitted by the electron emitters.

35 Claims, 8 Drawing Sheets

DATA STORAGE DEVICE

FIELD OF THE INVENTION

The present disclosure relates to a data storage device. More particularly, the disclosure relates to a data storage device incorporating ballistic or quasi-ballistic electron emitters.

BACKGROUND OF THE INVENTION

Researchers have continually attempted to increase the storage density and reduce the cost of data storage devices such as magnetic hard-drives, optical drives, and dynamic random access memory (DRAM). It has, however, become increasingly difficult to increase storage density due to fundamental limits such as the superparamagnetic limit, below which magnetic bits are unstable at room temperature.

Several approaches have been used to increase storage density of storage devices. One approach is based on scanned probe microscopy (SPM) technology. In such an approach, a probe is positioned extremely close to a storage medium. An example is atomic force microscopy (AFM) in which a probe is placed into physical contact with the storage medium. Another example is scanning tunneling microscopy (STM) in which the probe is placed within a few nanometers from the storage medium to ensure that the probe is within a tunneling range of the medium. Although limited success has been achieved through these approaches, it is difficult to inexpensively build a storage device having probes that contact or are in close proximity to the storage medium without eventually damaging the probe and/or the surface of the medium. Moreover, in STM, the spacing must be precisely controlled. As known by persons having ordinary skill in the art, such control is difficult to achieve.

In view of the difficulties associated with SPM, other researchers have developed methods that eliminate the need for extremely close proximity. One such technique is based on near-field scanning optical microscopy (NSOM). Although avoiding the proximity problem, this technique has limited lateral resolution and bandwidth and therefore is of limited applicability. Other techniques have been developed based on non-contact SFM, but these techniques typically suffer from poor resolution and poor signal to noise ratio.

Even where increased storage density can be achieved, hurdles to effective implementation exist. Once such hurdle is the time required to access data stored on the storage device the information. Specifically, the utility of the storage device is limited if a long time is required to retrieve the stored data. Therefore, in addition to high storage density, there must be a way to quickly access the data.

Recently, semiconductor-based electron sources have been developed that can be used in storage devices and which may avoid the difficulties noted above. An example of such a data storage device is described in U.S. Pat. No. 5,557,596. The device described in that patent includes multiple electron sources having electron emission surfaces that face a storage medium. During write operations, the electron sources bombard the storage medium with relatively high intensity electron beams. During read operations, the electron sources bombard the storage medium with relatively low intensity electron beams. Such a device provides advantageous results. For instance, the size of storage bits in such devices may be reduced by decreasing the electron beam diameter, thereby increasing storage density and capacity and decreasing storage cost.

One type of electron source described in the U.S. Pat. No. 5,557,596 is the "Spindt" emitter. As described in the patent, such an emitter has a cone shape that ends in a tip from which electron beams can be emitted. Typically, the tip is made as sharp as possible to reduce operating voltage and achieve a highly focused electron beam diameter. Unfortunately, utilization of Spindt emitters creates other problems. First, the fabrication of sharp emitter tips is difficult and expensive. In addition, focusing the electron beam from a Spindt tip in a temporally and spatially stable manner is difficult. Furthermore, the electron optics that provide the focusing can become complicated. Moreover, Spindt emitters do not operate well in poor vacuums. These problems become especially prominent as the electron beam diameter is reduced below 100 nanometers.

From the foregoing, it can be appreciated that it would be desirable to have a data storage device that employs electron emitters but that avoids one or more of the problems identified above.

SUMMARY OF THE INVENTION

The present disclosure relates to a data storage device, comprising a plurality of electron emitters adapted to emit electron beams, the electron emitters each having a planar emission surface, and a storage medium in proximity to the electron emitter, the storage medium having a plurality of storage areas that are capable of at least two distinct states that represent data, the state of the storage areas being changeable in response to bombardment by an electron beams emitted by the electron emitters, wherein data is written to the device by changing the state of the storage areas and data is read by the device by observing phenomena relevant to the storage areas.

In addition, the disclosure relates to a method for storing data, comprising the steps of emitting an electron beam from an electron emitter including a planar emission surface, directing the electron beam toward a storage medium comprising a plurality of storage areas, and bombarding one of the storage areas with electrons with the electron beam so as to change the state of a storage area. Typically, although not necessarily, the method further comprises the step of bombarding one of the storage areas with electrons with a lower current electron beam and observing its effect on the storage area.

The features and advantages of the invention will become apparent upon reading the following specification, when taken in conjunction with the accompanying drawings.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

DETAILED DESCRIPTION

Figure 1:
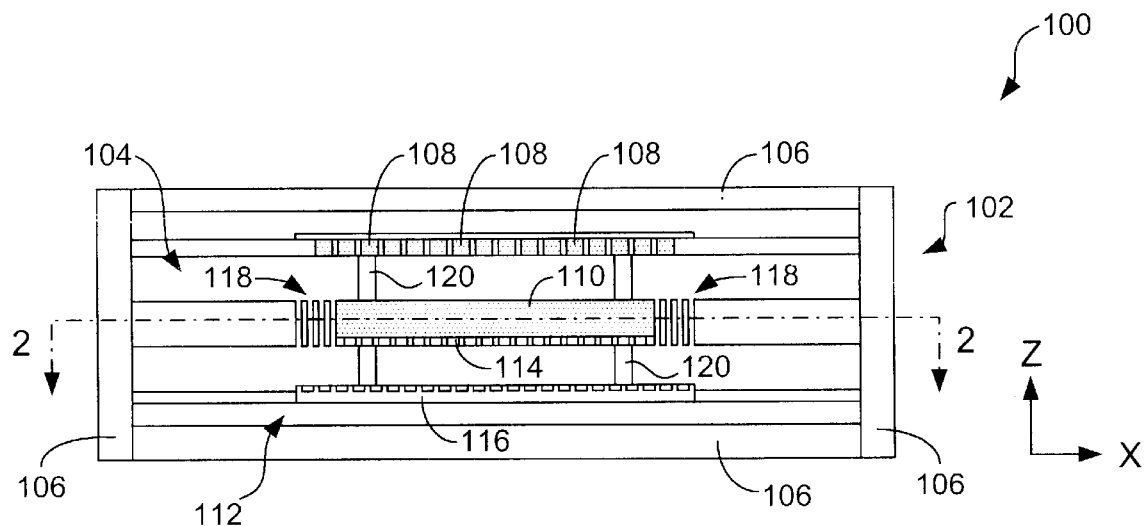
FIG. 1 is a schematic side view of an example data storage device.
Figure 2:
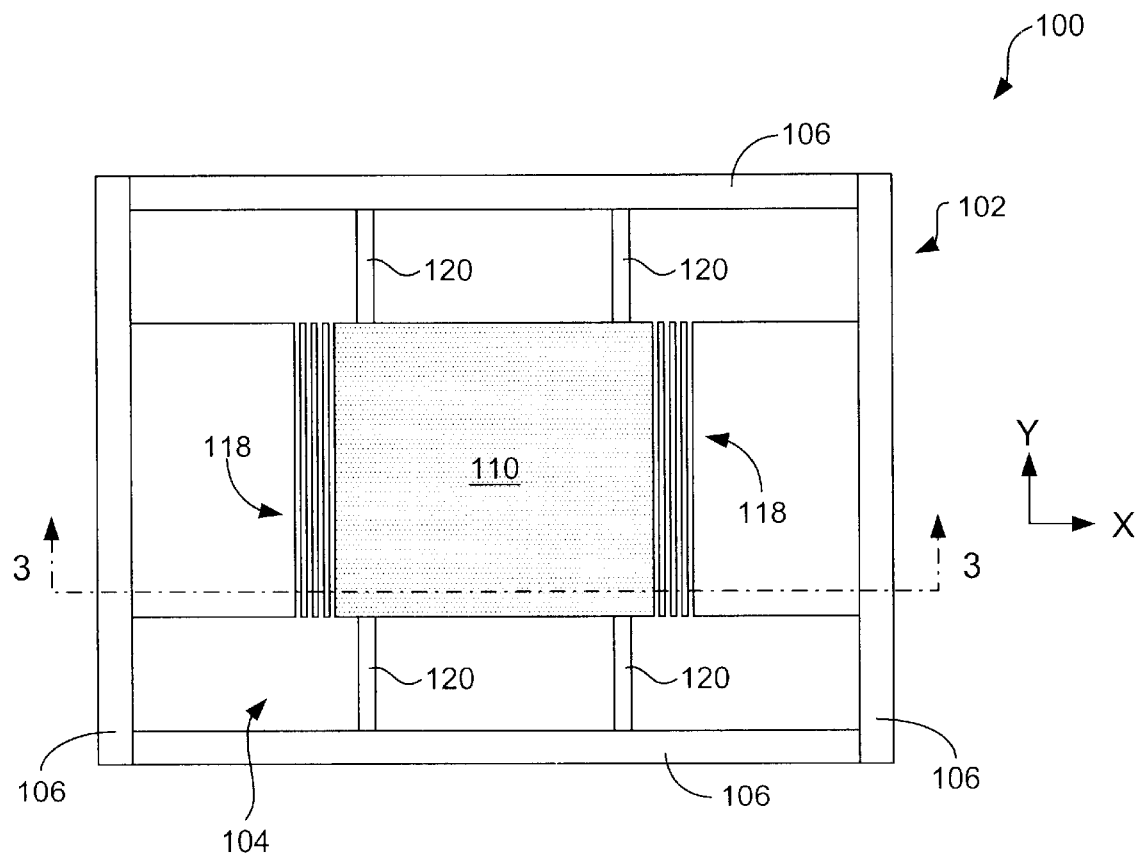
FIG. 2 is a schematic cross-sectional view of the data storage device of FIG. 1 taken along line 2—2.
Figure 3:
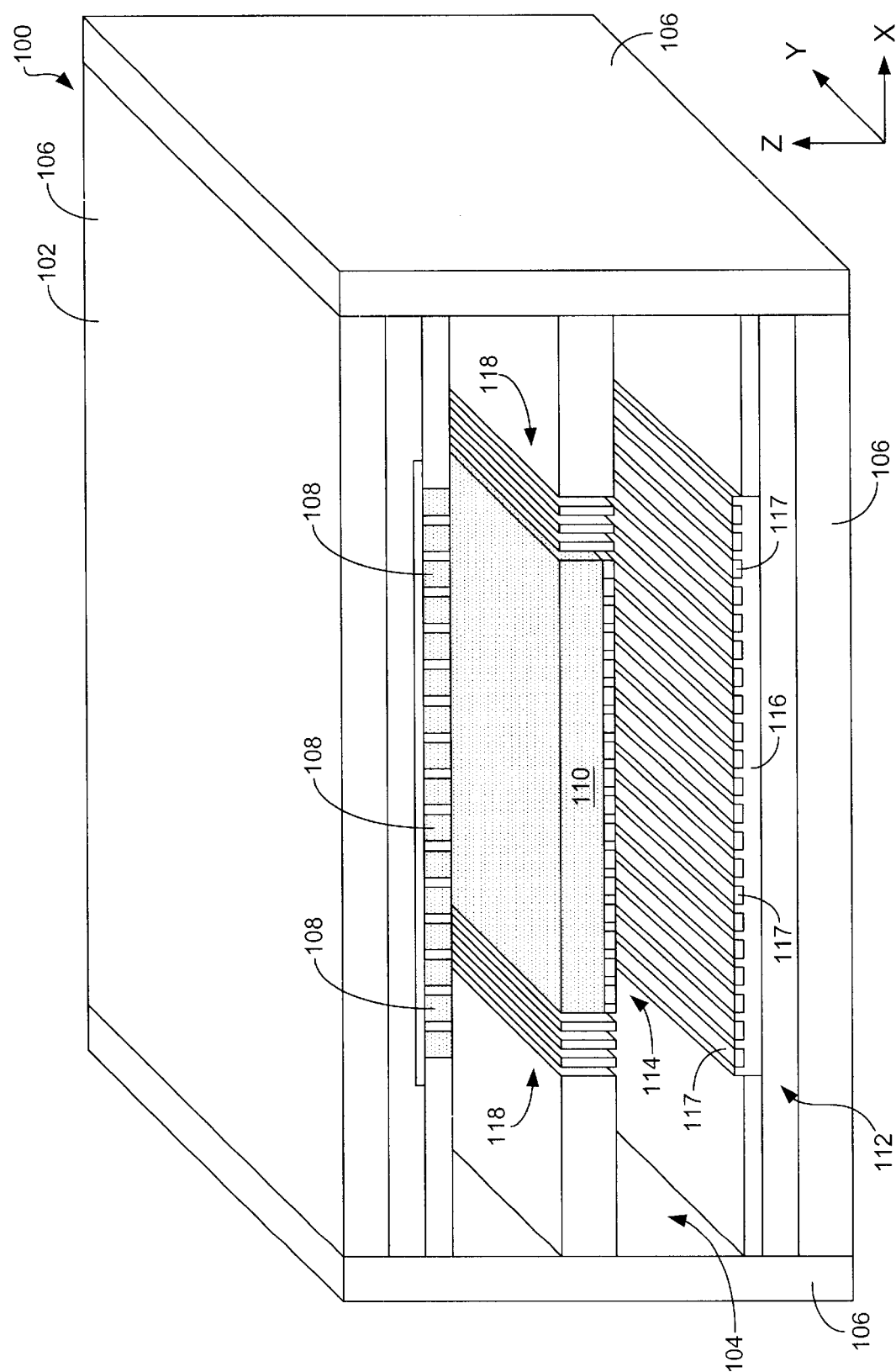
FIG. 3 is a schematic cross-sectional perspective view of the data storage device of FIGS. 1 and 2 taken along line 3—3.

Referring now in more detail to the drawings, in which like numerals indicate corresponding parts throughout the several views, FIGS. 1–3 illustrate an example data storage device 100. It is noted that this device 100 is similar in construction to that described in U.S. Pat. No. 5,557,596, which is hereby incorporated by reference into the present disclosure.

As indicated in FIGS. 1–3 the data storage device 100 generally includes an outer casing 102 that forms an interior space 104 therein. By way of example, the casing 102 can include a plurality of walls 106 that define the interior space 104. Typically, the walls 106 of the casing 102 are sealed to each other such that a vacuum can be maintained within the interior space 104. By way of example, the casing 102 maintains a vacuum of at least approximately $10^{-3}$ torr within the interior space 104. Although a particular configuration is shown for the casing 102, it is to be understood that the casing can take many different forms that would be readily apparent to persons having ordinary skill in the art.

Within the interior space 104 is a plurality of electron emitters 108 that face a storage medium 110. As described in relation to FIG. 4, the storage medium 110 comprises a plurality of storage areas (not visible in FIGS. 1–3). In a preferred embodiment, each storage area of the storage medium 110 is responsible for storing one or more bits of data.

Figure 9:
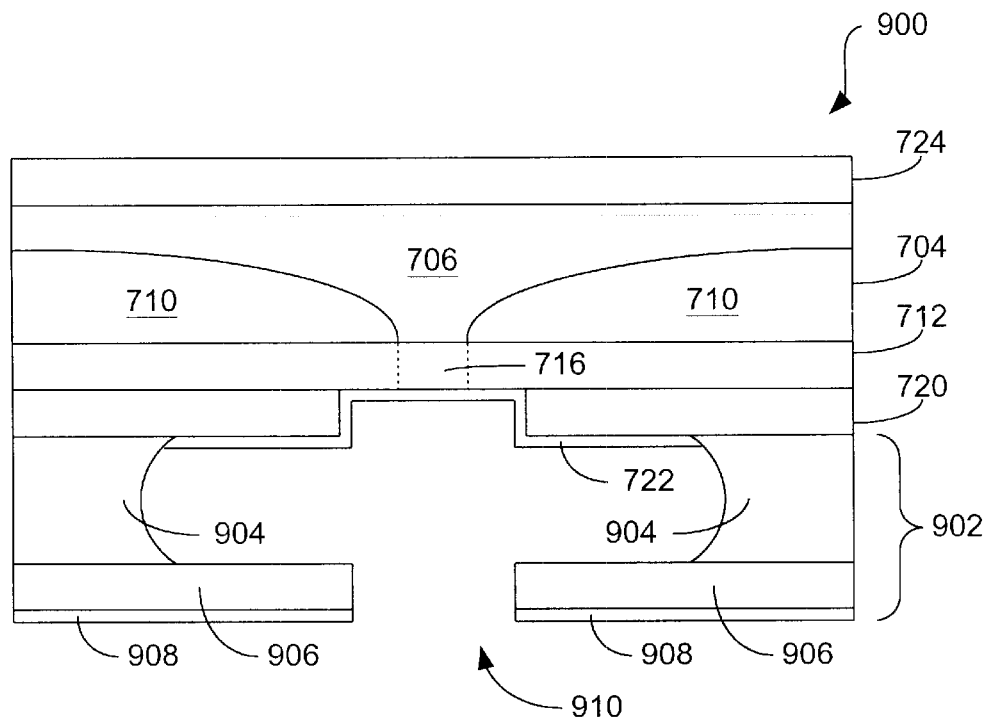
FIG. 9 is a schematic side view of a second electron emitter suitable for use with the data storage device of FIGS. 1–4.

The electron emitters 108 are configured to emit electron beam currents toward the storage areas of the storage medium 110 when a predetermined potential difference is applied to the electron emitters. Depending upon the distance between the emitters 108 and the storage medium 110, the type of emitters, and the spot size (i.e., bit size) required, electron optics may be useful in focusing the electron beams. An example of such optics is provided below (FIG. 9). Voltage is also applied to the storage medium 110 to either accelerate or decelerate the emitted electrons and/or to aid in focusing the emitted electrons.

Each electron emitter 108 can serve many different storage areas to write data to and read data from the storage medium 110. To facilitate alignment between each electron emitter 108 and an associated storage area, the electron emitters and storage medium can be moved relative to each other in the X and Y directions noted in FIG. 2. To provide for this relative movement, the data storage device 100 can include a micromover 112 that scans the storage medium 110 with respect to the electron emitters 108. As indicated in FIGS. 1 and 3, the micromover 112 can include a rotor 114 connected to the storage medium 110, a stator 116 that faces the rotor, and one or more springs 118 that are positioned to the sides of the storage medium. As is known in the art, displacement of the rotor 114, and thereby the storage medium 110, can be effected by the application of appropriate potentials to electrodes 117 of the stator 116 so as to create a field that displaces the rotor 114 in a desired manner.

When the micromover 112 is displaced in this manner, the micromover scans the storage medium 110 to different locations within the X-Y plane such that each emitter 108 is positioned above a particular storage area. A preferred micromover 112 preferably has sufficient range and resolution to position the storage areas 110 under the electron emitters 108 with high accuracy. By way of example, the micromover 112 can be fabricated through semiconductor microfabrication processes. Although relative movement between the electron emitters 108 and the storage medium 110 has been described as being accomplished through displacement of the storage medium, it will be understood that such relative movement can alternatively be obtained by displacing the electron emitters or by displacing both the electron emitters and the storage medium. Moreover, although a particular micromover 112 is shown and described herein, it will be appreciated by persons having ordinary skill in the art that alternative moving means could be employed to obtain such relative movement.

Alignment of an emitted beam and storage area can be further facilitated with deflectors (not shown). By way of example, the electron beams can be rastered over the surface of the storage medium 110 by either electrostatically or electromagnetically deflecting them, as through use of electrostatic and/or electromagnetic deflectors positioned adjacent the emitters 108. Many different approaches to deflect electron beams can be found in literature on scanning electron microscopy (SEM).

The electron emitters 108 are responsible for reading and writing information on the storage areas of the storage medium with the electron beams they produce. Therefore, the electron emitters 108 preferably produce electron beams that are narrow enough to achieve the desired bit density for the storage medium 110, and that provide the different power densities needed for reading from and writing to the medium. Particular example embodiments for the electron emitters 108 are provided later in this disclosure.

As indicated in FIGS. 1 and 2, the data storage device 100 can further include one or more supports 120 that support the storage medium 110 in place within the interior space 104. When provided, the supports 120 typically comprise thin-walled microfabricated beams that flex when the storage medium 110 is displaced in the X and/or Y directions. As is further indicated in FIGS. 1 and 2, the supports 120 can each be connected to the walls 106 of the casing 102.

Figure 4:
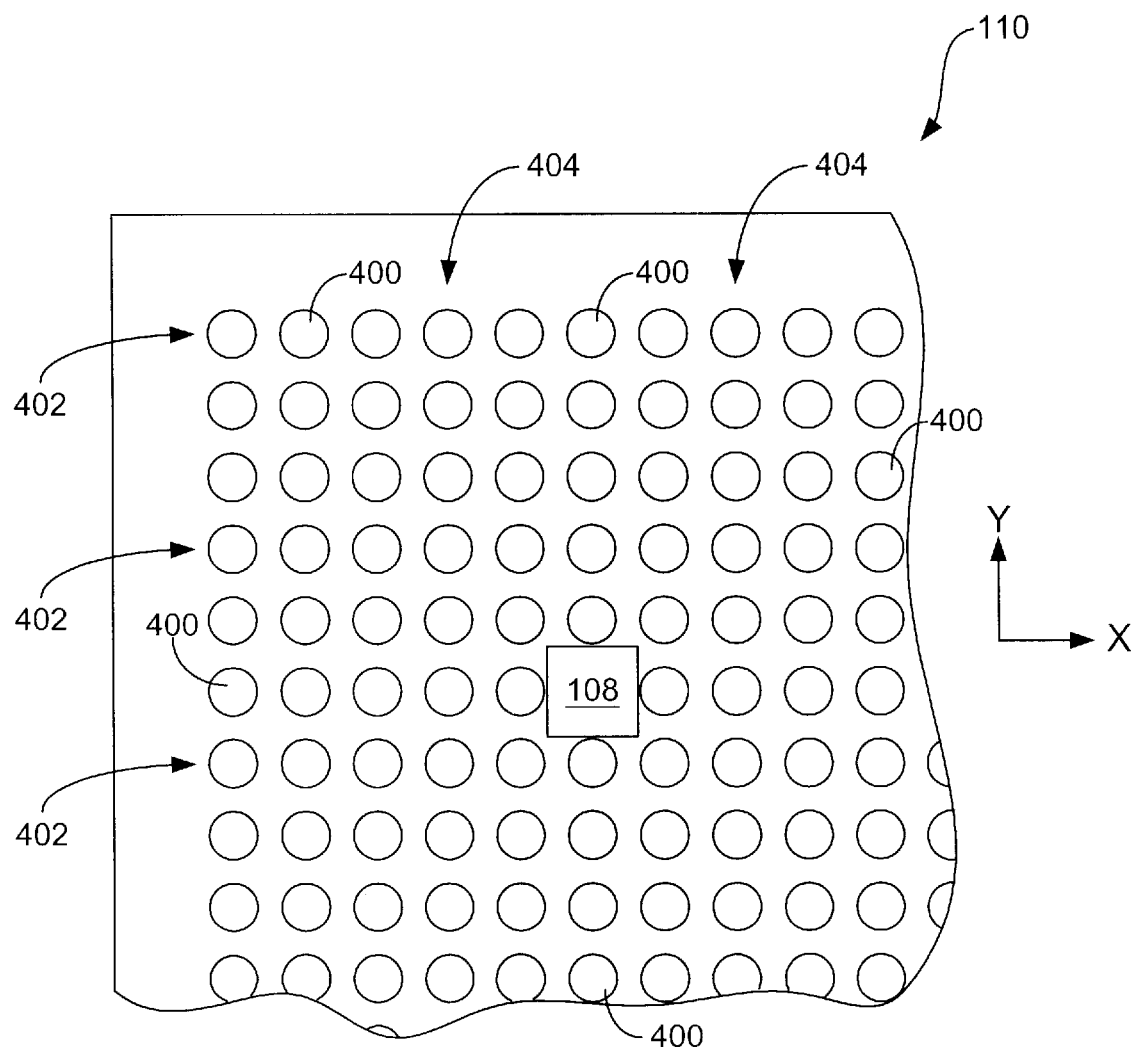
FIG. 4 is a partial schematic view of a storage medium of the data storage device shown in FIGS. 1–3.

In a preferred embodiment, the electron emitters 108 are contained within a two-dimensional array comprising a plurality of emitters. By way of example, an array of 100×100 electron emitters 108 can be provided with an emitter pitch of approximately 5 to 100 micrometers in both the X and Y directions. As discussed above, each emitter 108 typically is used to access a plurality of storage areas of the storage medium 110. FIG. 4 provides a schematic representation of this relationship. In particular, this figure illustrates a single electron emitter 108 positioned above a plurality of storage areas 400 of the storage medium 110. As indicated in FIG. 4, the storage areas 400, like the electron emitters 108, are contained in a two-dimensional array. In particular, the storage areas 400 are arranged in separate rows 402 and columns 404 on the surface of the storage medium 110. In a preferred an embodiment, each emitter 108 is only responsible for a portion of the entire length of predetermined numbers of rows 402. Accordingly, each emitter 108 normally can access a matrix of storage areas 400 of particular rows 402 and columns 404. Preferably, each row 402 that is accessed by a single electron emitter 108 is connected to a single external circuit.

To address a storage area 400, the micromover 112 is activated to displace the storage medium 110 (and/or electron emitters 108) to align the storage area with a particular electron emitter. Typically, each emitter 108 can access tens of thousands to hundreds of millions of storage areas 400 in this manner. The storage medium 110 can have a periodicity of approximately 1 to 100 nanometers between any two storage areas 400, and the range of the micromover 112 can be approximately 5–100 micrometers. As will be appreciated by persons having ordinary skill in the art, each of the electron emitters 108 can be addressed simultaneously or in a multiplexed manner. A parallel accessing scheme can be used to significantly increase the data rate of the storage device 100.

Writing with the data storage device 100 is accomplished by temporarily increasing the power density of an electron beam produced by an electron emitter 108 to modify the surface state of a storage area 400 of the storage medium 110. For instance, the modified state can represent a "1" bit, while the unmodified state can represent a "0" bit. Moreover, the storage areas can be modified to different degrees to represent more than two bits, if desired. In a preferred embodiment, the storage medium 110 is constructed of a material whose structural state can be changed from crystalline to amorphous by electron beams. An example material is germanium telluride (GeTe) and ternary alloys based on GeTe. To change from the amorphous to the crystalline state, the beam power density can be increased and then slowly decreased. This increase/decrease heats the amorphous area and then slowly cools it so that the area has time to anneal into its crystalline state. To change from the crystalline to amorphous state, the beam power density is increased to a high level and then rapidly reduced. Although temporary modification of the storage medium 110 is described herein, it will be understood that permanent modification is possible where write-once-read-many (WORM) functionality is desired.

Reading is accomplished by observing the effect of the electron beam on the storage area 400, or the effect of the storage area on the electron beam. During reading, the power density of the electron beam is kept low enough so that no further writing occurs. In a first reading approach, reading is accomplished by collecting the secondary and/or backscattered electrons when an electron beam with a relatively low (i.e., lower than that needed to write) power density is applied to the storage medium 110. In that the amorphous state has a different secondary electron emission coefficient (SEEC) and backscattered electron coefficient (BEC) than the crystalline state, a different number of secondary and backscattered electrons are emitted from a storage area 400 when bombarded with a read electron beam. By measuring the number of secondary and backscattered electrons, the state of the storage area 106 can be determined.

Figure 5:
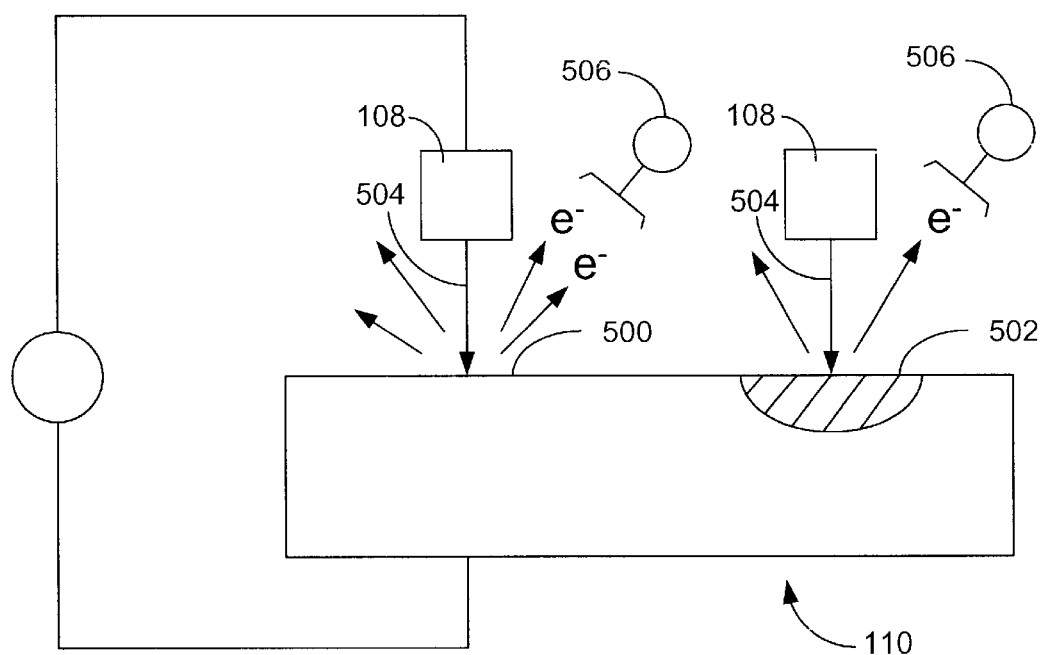
FIG. 5 is a schematic side view of a first example reading arrangement for the data storage device of FIGS. 1–4.

FIG. 5 illustrates example apparatus for reading according to the first reading approach. More particularly, FIG. 5 schematically illustrates electron emitters 108 reading from storage areas 500 and 502 of the storage medium 110. In this figure, the state of storage area 500 has been modified, while the state of storage area 502 has not. When a beam 504 of electrons bombard the storage areas 500, 502 both the secondary electrons and backscattered electrons are collected by electron collectors 506. As will be appreciated by persons having ordinary skill in the art, modified storage area 500 will produce a different number of secondary electrons and backscattered electrons as compared to unmodified storage area 502. The number may be greater or lesser depending upon the type of material and the type of modification made. By monitoring the magnitude of the signal current collected by the electron collectors 506, the state of and, in turn, the bit stored in the storage areas 500 and 502 can be identified.

Figure 6:
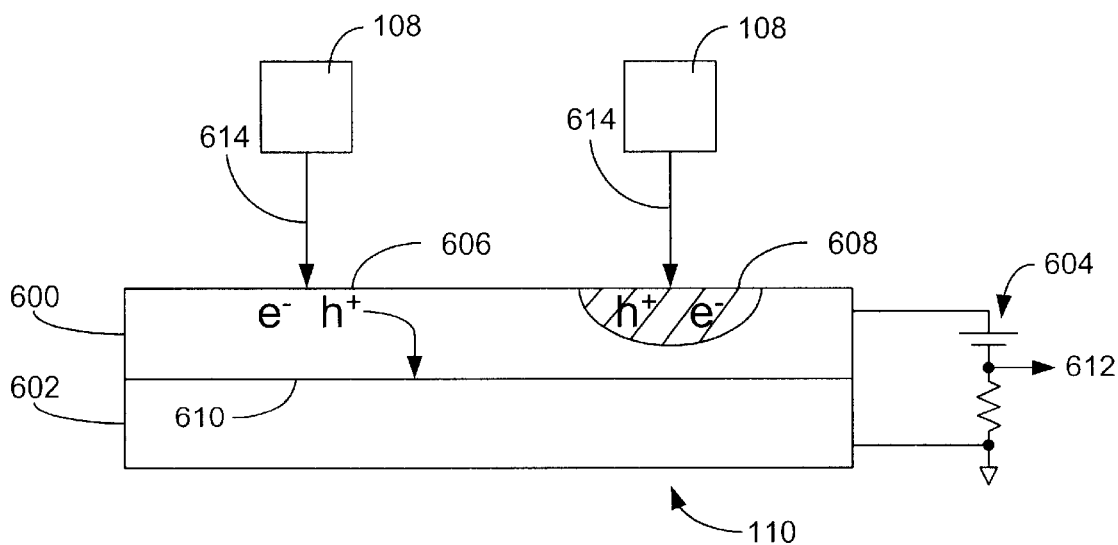
FIG. 6 is a schematic side view of a second example reading arrangement for the data storage device of FIGS. 1–4.

In another reading approach, a diode structure is used to determine the state of the storage areas 400. According to this approach, the storage medium 110 is configured as a diode which can, for example, comprise a p-n junction, a schottky barrier, or substantially any other type of electronic valve. FIG. 6 illustrates an example configuration of such a storage medium 110. It will be understood that alternative diode arrangements (such as those shown in U.S. Pat. No. 5,557,596) are feasible. As indicated in this figure, the storage medium 110 is arranged as a diode having two layers 600 and 602. By way of example, one of the layers is p type and the other is n type. The storage medium 110 is connected to an external circuit 604 that reverse-biases the storage medium. With this arrangement, bits are stored by locally modifying the storage medium 110 in such a way that collection efficiency for minority carriers generated by a modified region 608 is different from that of an unmodified region 606. The collection efficiency for minority carriers can be defined as the fraction of minority carriers generated by the instant electrons that are swept across a diode junction 610 of the storage medium 110 when the medium is biased by the external circuit 604 to cause a signal current 612 to flow through the external circuit.

In use, the electron emitters 108 emit narrow beams 614 of electrons onto the surface of the storage medium 110 that excite electron-hole pairs near the surface of the medium. Because the medium 110 is reverse-biased by the external circuit 604, the minority carriers that are generated by the incident electrons are swept toward the diode junction 610. Electrons that reach the junction 610 are then swept across the junction. Accordingly, minority carriers that do not recombine with majority carriers before reaching the junction 610 are swept across the junction, causing a current flow in the external circuit 604.

As described above, writing is accomplished by increasing the power density of electron beams enough to locally alter the physical properties of the storage medium 110. Where the medium 110 is configured as that shown in FIG. 6, this alteration affects the number of minority carriers swept across the junction 610 when the same area is radiated with a lower power density read electron beam. For instance, the recombination rate in a written (i.e., modified) area 608 could be increased relative to an unwritten (i.e., unmodified) area 606 so that the minority carriers generated in the written area have an increased probability of recombining with minority carriers before they have a chance to reach and cross the junction 610. Hence, a smaller current flows in the external circuit 604 when the read electron beam is incident upon a written area 608 than when it is incident upon an unwritten area 606. Conversely, it is also possible to start with a diode structure having a high recombination rate and to write bits by locally reducing the recombination rate. The magnitude of the current resulting from the minority carriers depends upon the state of particular storage area, and the current continues the output signal 612 to indicate the bit stored.

Figure 7:
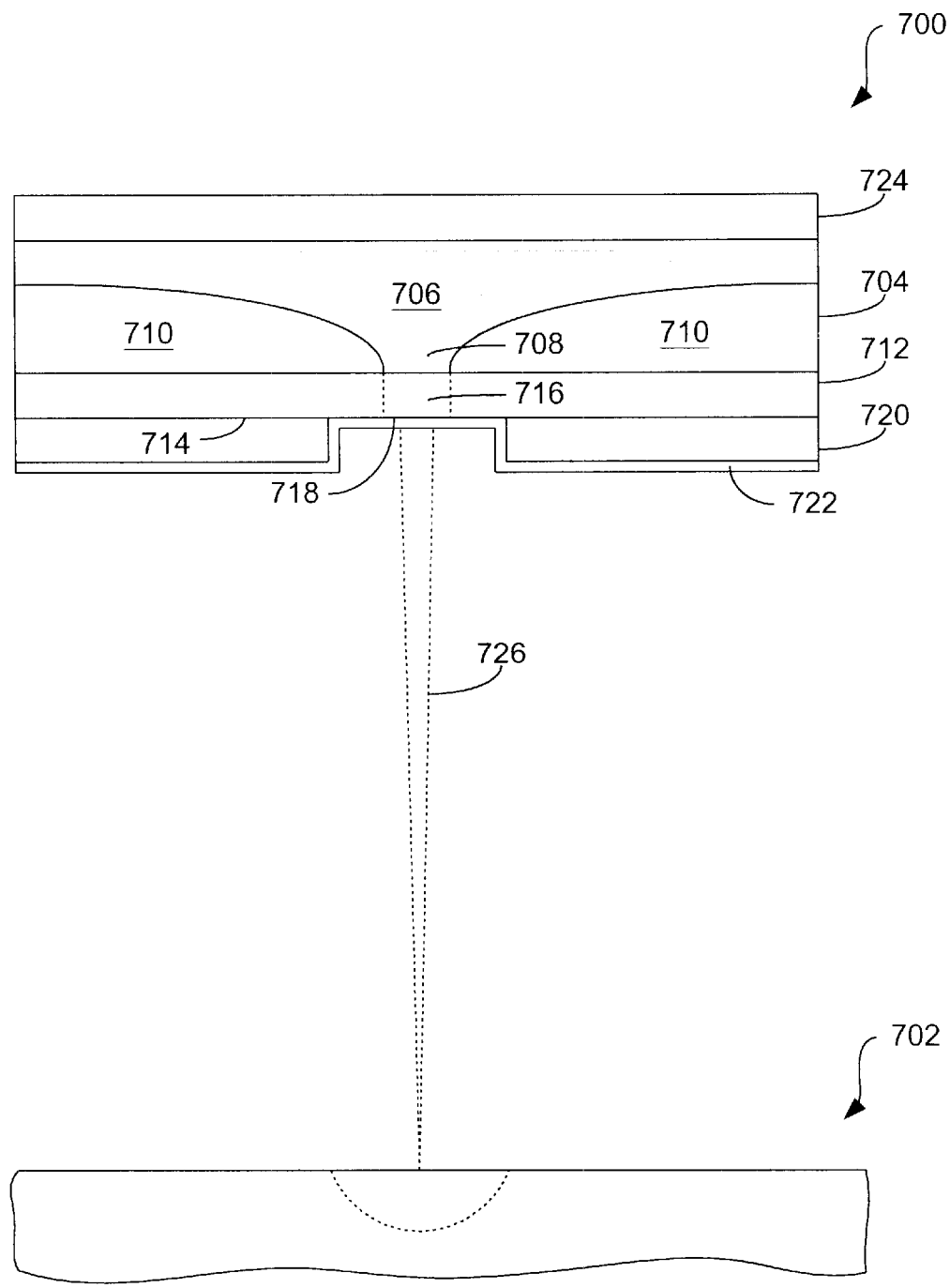
FIG. 7 is a schematic side view of a first electron emitter suitable for use with the data storage device of FIGS. 1–4.

As identified above, various hurdles exist to the use of Spindt (i.e., tip) electron emitters. Accordingly, alternative emitter configurations are contemplated. Generally speaking, these alternative electron emitters comprise ballistic or quasi-ballistic electron emitters. More particularly, the electron emitters are configured as flat emitters. FIG. 7 illustrates a first example flat electron emitter 700 that can be used in the data storage device 100 to bombard a target 702 (e.g., storage medium 110). As indicated in this figure, the emitter 700 includes an n++ semiconductor substrate 704 that, for example, can be made of silicon. Typically, the thickness of the substrate depends upon the size of the wafer used to form the substrate. By way of example, the substrate 704 can be approximately 400 to 1000 micrometers thick. The substrate 704 is fabricated such that it includes a volcano-like, funnel-like, or nozzle-like active region 706. Stated in other words, the active region 706 generally has a wide base that quickly narrows into a neck 708.

The active region 706 is surrounded by an isolation region 710 that limits the geometry of the active region 706 to limit the area from which the active region can emit electrons. By way of example, the isolation region 710 comprises silicon dioxide that is formed through an oxidation process (e.g., wet or dry oxidation). In addition to limiting the geometry of the active region 706, the isolation region 710 isolates the active region 706 from neighboring active regions (not shown). However, it will be understood that bases of the active regions 706 of contiguous electron emitters 700 can be connected together.

Formed on the substrate 704 is a semiconductor layer 712. By way of example, the semiconductor layer 712 is made of polysilicon or silicon carbide (SiC) and has a thickness of approximately 0.01 to 2 micrometers. In a preferred arrangement, the semiconductor layer 712 includes a planar outer surface 714 and a porous region 716. As indicated in FIG. 7, the porous region 716 is limited in extent such that it is aligned with the neck 708 of the active region 706. Limiting the porous region in this manner allows for higher current densities due to increased thermal energy dissipation. The porous region 716 terminates at the outer surface 714 to define an emission surface 718. In that the surface 714 preferably is planar, the emission surface 718 likewise preferably is planar. This configuration permits better focusing of electron beams emitted from the emitter 700. By way of example, the area of the emission surface 718 can be limited to less than approximately 10% of the total area of the outer surface 714 of the semiconductor layer 712. Most preferably, the area of the emission surface 718 is limited to less than approximately 1% of the total area of the surface 714.

The electron emitter 700 further includes an emission electrode 720 formed on the semiconductor layer 712 that is used to supply voltage to the semiconductor layer 712. The emission electrode 720 typically is composed of a highly electrically conductive material such as chromium and can have a thickness of approximately 0.1 to 1 micrometer. In addition to the emission electrode 720, the emitter 700 includes a conductive layer 722 that covers the emission electrode 720 and a portion of the outer surface 714 of the semiconductor layer 712, including the emission surface 718. This layer 722 is preferably thin and can, for instance, have a thickness of approximately 10 nanometers or less. The conductive layer 722 provides an electrical contact over the emission surface 718 and allows an electric field to be applied over the emission surface 718. Preferably, the conductive layer 722 comprises an alloy that does not form an insulating oxide or nitride on its surface to avoid the creation of tunnel barriers that would negatively effect the efficiency of the electron emitter 700.

Figure 8:
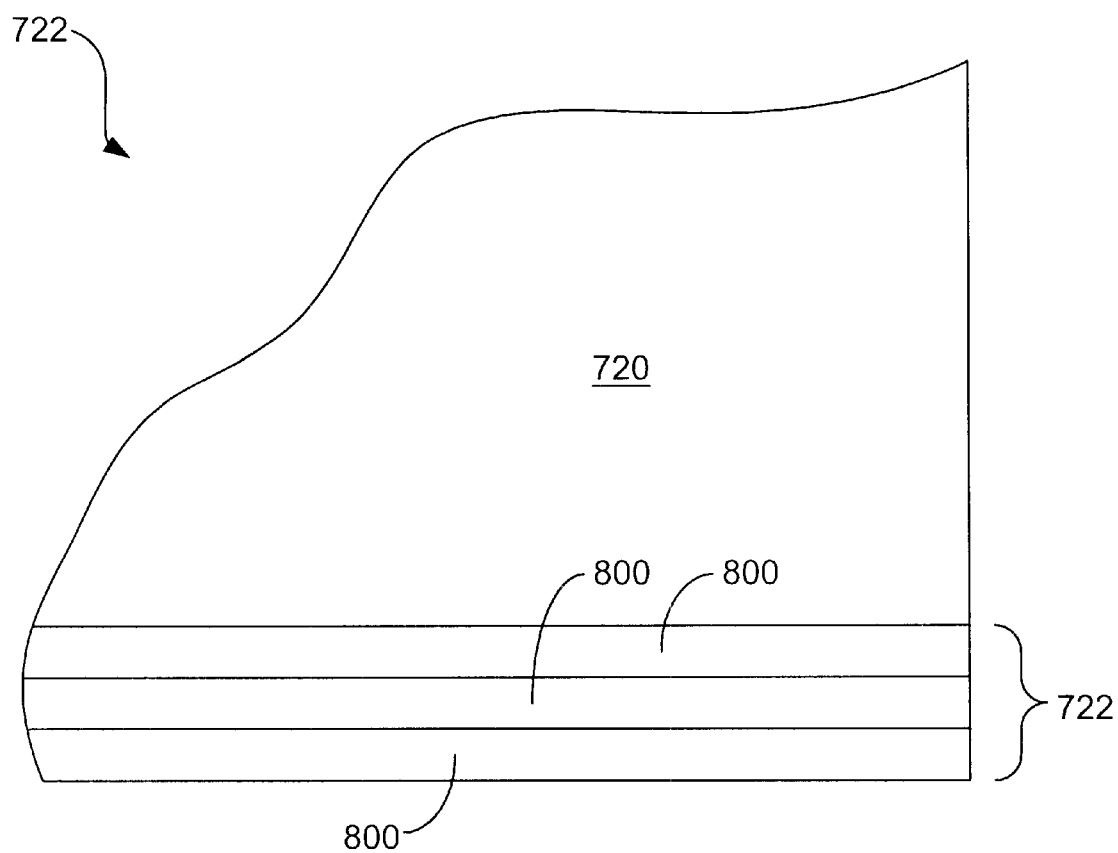
FIG. 8 is a detail view of a conductive layer of the first electron emitter shown in FIG. 7.

By way of example, the conductive layer 722 can be made of a thin metal or conductive material such as gold, carbon (e.g., graphite, electrically conductive diamond, or combinations thereof), platinum, iridium, rhodium, conductive boron nitride, or other conductors or semiconductors. Generally speaking, materials having atomic numbers substantially below that of gold may also be used for the conductive layer 722 in that such materials do not scatter electrons (which lowers emission efficiency) to the extent that materials having higher atomic numbers do. As a low atomic number element, carbon exhibits very low electron scattering probability. The conductive layer 722 can be porous or semi-dense such that all conductive areas are electrically connected. For example, the conductive layer 722 can include electrically interconnected conductive islands, a mesh of interconnected filaments, or a combinations thereof. In an alternative embodiment, the conductive layer 722 can comprise multiple thin layers 800 of metal, as shown in the detail view of FIG. 8.

The electron emitter 700 can further include a back contact 724 that is formed on the substrate 704 on a side opposite that on which the semiconductor layer 712 is formed. When provided, the back contact 724 establishes an equipotential surface for internal fields in the semiconductor substrate 704 and the porous region 716. It is to be understood that the back contact 724 can be eliminated if the substrate 704 is highly doped, in which case a contact can be made to the substrate via a front contact through known means.

During operation, different potentials are applied (e.g., with on or off-chip drivers) to the substrate 704, the emission electrode 712, and the back contact 724. The resulting emission electrode voltage causes electrons to be injected from the active region 706 of the substrate 704 into the porous region 716 of the semiconductor layer 712 and be emitted from the emission surface 718 and through the conductive layer 722. This emission results in an electron beam 726 that impinges the target 702.

As will be appreciated by persons having ordinary skill in the art, focusing means may be needed to focus the beam 726 on the target 702. One example of such focusing means are illustrated in FIG. 9 which illustrates a second example flat electron emitter 900. As indicated in this figure, the emitter 900 is similar in several ways to the emitter 700 shown in FIG. 7. Accordingly, the emitter 910 comprises a substrate 704 including an active region 706 and an isolation region 710, a semiconductor layer 712 including a porous region 716, an emission electrode 720, a conductive layer 722, and a back contact 724. In addition, the electron emitter 900 includes a focusing structure 902 that is used to focus the electron beams emitted from the emitter 900.

As shown in FIG. 9, the focusing structure 902 comprises an insulating layer 904, a lens electrode 906, and a second conductive layer 908. The insulating layer 904 isolates the emission electrode 720 from the lens electrode 906. Like the conductive layer 722, the conductive layer 908 provides a contact over the lens electrode 906 such that an electric field can be applied thereto. As indicated in FIG. 9, the lens electrode 906 and the conductive layer 908 are formed so as to define an aperture 910 through which electron beams can pass. In use, a potential is applied to the lens electrode 906. The electric field resulting from the lens electrode voltage at the aperture 910 causes the emitted electrons to be focused.

Typically, this focus can be adjusted by varying the potential applied to the lens electrode 906. The electron beam can be focused to a very small spot size, e.g., less than 1 nanometer in diameter, on the target (not shown). Although a particular focusing arrangement has been shown and described, it will be appreciated by persons having ordinary skill in the art that many different focusing arrangements are possible and that others may even be more preferable.

Figure 10:
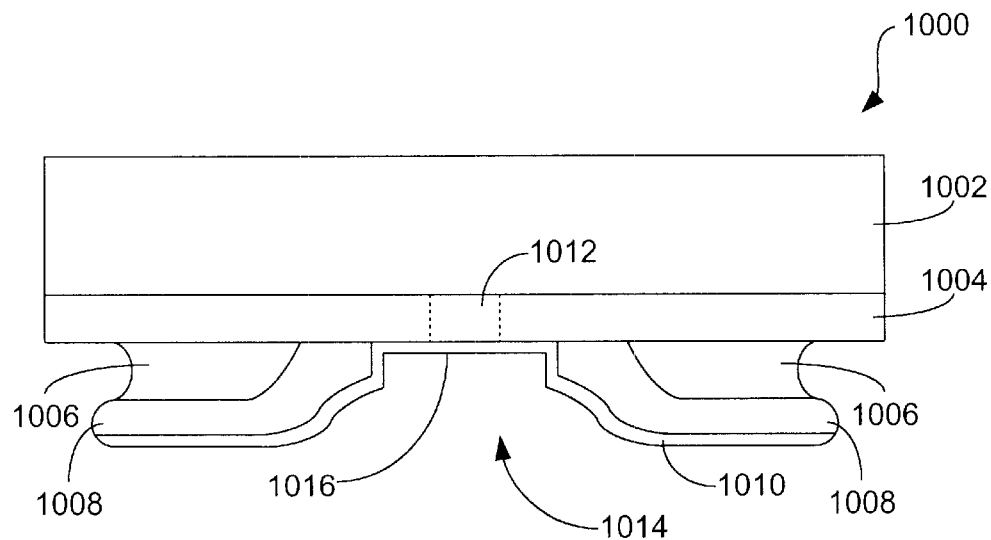
FIG. 10 is a schematic side view of a third electron emitter suitable for use with the data storage device of FIGS. 1–4.

FIG. 10 illustrates a third example flat electron emitter 1000 that can be used in the data storage device 100. The electron emitter 1000 includes a n++ semiconductor substrate 1002 and a semiconductor layer 1004 that is formed on the substrate. By way of example, the substrate 1002 can comprise silicon and the layer can comprise polysilicon. In addition, the emitter 1000 includes an insulating layer 1006, a patterning mask 1008, and a conductive layer 1010. The patterning mask 1008 is deposited on the semiconductor layer 1004 and the insulating layer 1006. In similar manner, the conductive layer 1010 is deposited on the patterning mask 1008 and the semiconductor layer 1004. The semiconductor layer 1004 includes a porous region 1012. An opening 1014 in the patterning mask 1008 defines an emission area 1016 of the emitter 1000.

Electron emission can be achieved with emitter structures distinct from those described above. For example, the electron source may be adapted to emit electrons from the surfaces of metal-insulator-metal (MINI) and metal-insulator-oxide (MIS) structures at or below room temperature. This type of electron emission is described in Wade & J Briggs, "Low noise Beams from Tunnel Cathodes," *Journal of Applied Physics* 33, No. 3, pp. 836–840, 1962; Julius Cohen, "Tunnel Emission into Vacuum," Applied *Physics Letters* 1, No 3, pp. 61–62, 1962; and Yokoo, et al., "Emission characteristics of metaloxide-semiconductor electron tunneling cathode," *Journal of Vacuum Science and Technology*, pp. 429–432, 1993. Electrons from MIM and MIS structures are emitted into the vacuum with small divergence angles as described in R. Hrach, *Thin Solid Films* 15, p. 15, 1973. Small divergence angles allow the emitted electrons to be focused into small diameter electron beams.

Figure 11:
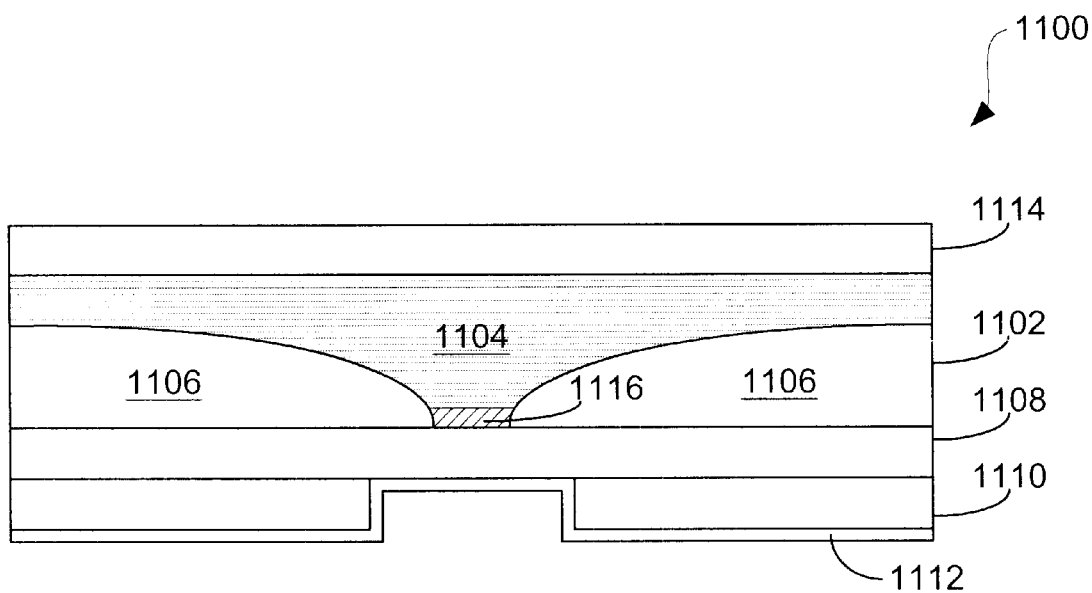
FIG. 11 is a schematic side view of a fourth electron emitter suitable for use with the data storage device of FIGS. 1–4.

FIG. 11 shows a flat electron emitter 1100 that includes a MIM-based electron emission structure. As indicated in this figure, the emitter 1100 includes a substrate 1102 including an active region 1104 and an isolation region 1106, an insulator layer 1108, an emission electrode 1110, a conductive layer 1112, and a back contact 1114. Included in the active region 1104 of the substrate 1102 adjacent the insulator layer 1108 is a thin metal layer 1116. Therefore, a metal-insulator-metal arrangement is obtained by the conductive layer 1112, the insulator layer 1108, and the metal layer 1116. Although a particular MIM arrangement is shown and described, it will be appreciated by persons having ordinary skill in the art that alternative arrangements are feasible.

Figure 12:
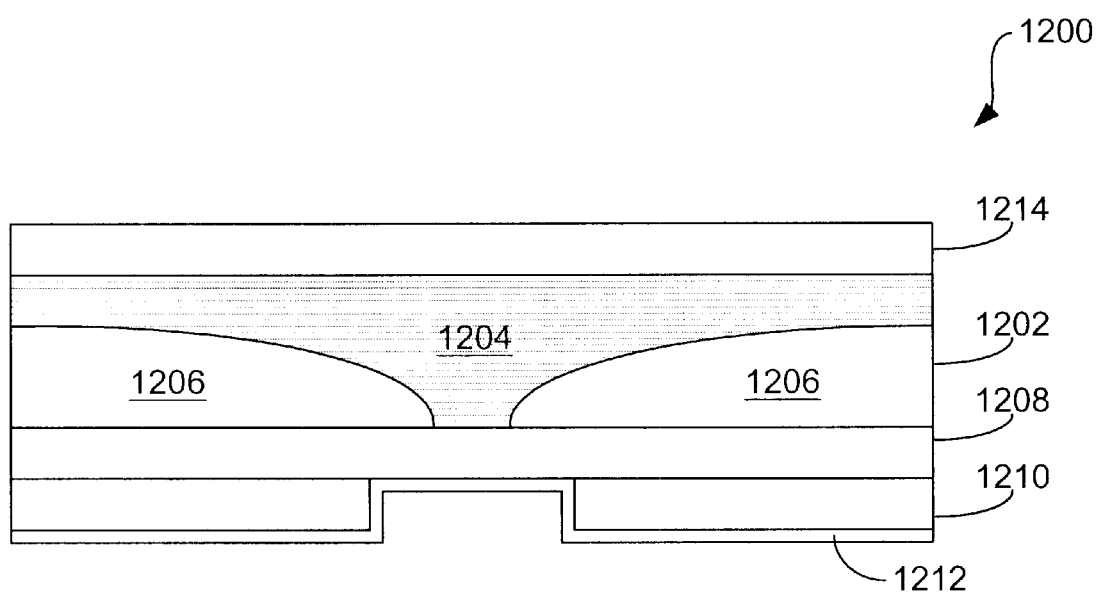
FIG. 12 is a schematic side view of a fifth electron emitter suitable for use with the data storage device of FIGS. 1–4.

FIG. 12 shows a flat electron emitter 1200 that includes a MIS-based electron emission structure. As indicated in this figure, the emitter 1200 includes a silicon substrate 1202 including an active region 1204 and an isolation region 1206, an insulator layer 1208, an emission electrode 1210, a conductive layer 1212, and a back contact 1214. The metal-insulator-silicon arrangement is obtained by the conductive layer 1212, the insulator layer 1208, and the substrate 1202. Although a particular MIS arrangement is shown and described, it will be appreciated by persons having ordinary skill in the art that alternative arrangements are feasible.

While particular embodiments of the invention have been disclosed in detail in the foregoing description and drawings for purposes of example, it will be understood by those skilled in the art that variations and modifications thereof can be made without departing from the scope of the invention as set forth in the following claims.

What is claimed is:

1. A data storage device, comprising:

a plurality of electron emitters adapted to emit electron beams, each electron emitter having a planar emission surface; and a storage medium in proximity to the electron emitters, the storage medium having a plurality of storage areas that are capable of at least two distinct states that represent data, the state of each storage area being changeable in response to bombardment by an electron beam emitted by an electron emitter;

wherein data is written to the device by changing the state of the storage areas and data is read by the device by observing phenomena relevant to the storage areas.

2. The device of claim 1, further comprising electron collectors positioned so as to receive secondary and back-scattered electrons produced by the storage areas in response to incident electron beams.

3. The device of claim 1, wherein the storage medium is a diode and the storage areas produce minority carriers in response to incident electron beams.

4. The device of claim 1, wherein the electron emitters each comprise a semiconductor layer having an outer surface that forms the emission surface.

5. The device of claim 4, wherein the emission surface occupies an area that comprises a small fraction of the total area of the outer surface.

6. The device of claim 5, wherein the emission surface occupies an area that represents approximately less than 10% of the total area of the outer surface.

7. The device of claim 4, wherein the semiconductor layer includes a porous region that extends through the semiconductor layer to the emission surface.

8. The device of claim 7, further comprising a substrate on which the semiconductor layer is formed, the substrate having an active region that narrows to a neck that has a cross-sectional area that approximates a cross-sectional area of the porous region.

9. The device of claim 8, wherein the active region has a funnel-like shape.

10. The device of claim 1, further comprising a conductive layer formed on the planar emission surface.

11. The device of claim 10, wherein the conductive layer has a thickness of approximately 10 nanometers or less.

12. The device of claim 10, wherein the conductive layer comprises multiple metal layers.

13. The device of claim 1, further comprising focusing structures that focus electron beams emitted from the electron emitters.

14. The device of claim 13, wherein the focusing structures define apertures through which emitted electron beams pass.

15. The device of claim 14, wherein the focusing structures each include a lens electrode that defines the aperture.

16. The device of claim 1, further including patterning masks that define the planar emission surfaces.

17. The device of claim 1, wherein the electron emitters are metal-insulator-metal (MIM) electron emission structures.

18. The device of claim 1, wherein the electron emitters are metal-insulator-silicon (MIS) electron emission structures.

19. A data storage device, comprising:

means for emitting electron beams, the means including planar emission surfaces; and means for storing data capable of at least two distinct states that represent data, the state being changeable in response to bombardment by an electron beam emitted by the means for emitting electron beams;

wherein data is written to the device by changing the state of the means for storing data and data is read by the device by observing phenomena relevant to the means for storing data.

20. The device of claim 19, further comprising means for collecting secondary and backscattered electrons produced by the means for storing data in response to incident electron beams.

21. The device of claim 19, wherein the means for storing data comprise a diode that produces minority carriers in response to incident electron beams.

22. The device of claim 19, further comprising means for focusing electron beams emitted from the means for emitting electron beams.

23. A method for storing data, comprising the steps of:

emitting an electron beam from an electron emitter including a planar emission surface;

directing the electron beam toward a storage medium comprising a plurality of storage areas; and bombarding one of the storage areas with electrons with the electron beam so as to change a state of the storage area.

24. The method of claim 23, wherein the storage area is changed from a crystalline state to an amorphous state.

25. The method of claim 23, wherein the storage area is changed from an amorphous state to a crystalline state.

26. The method of claim 23, further comprising the step of collecting secondary and backscattered electrons produced by the storage area in response to an incident electron beam to determine the state of the storage area.

27. The method of claim 23, further comprising the step of observing the effect on minority carriers produced by the storage area in response to an incident electron beam to determine the state of the storage area.

28. A data storage device, comprising:

a plurality of electron emitters adapted to emit electron beams, the electron emitters each including a substrate having an active region and a semiconductor layer formed on the substrate, the semiconductor layer including a planar outer surface that forms a planar emission surface; and a storage medium in proximity to the electron emitter, the storage medium having a plurality of storage areas that are capable of at least two distinct states that represent data, the state of the storage areas being changeable in response to bombardment by electron beams emitted by the electron emitters;

wherein data is written to the device by changing the state of the storage areas and data is read by the device by observing phenomena relevant to the storage areas.

29. The device of claim 28, wherein the emission surface occupies an area that represents approximately less than 10% of a total area of the outer surface.

30. The device of claim 28, wherein the semiconductor layer includes a porous region that extends through the semiconductor layer to the emission surface.

31. The device of claim 28, wherein the substrate has an active region that narrows to a neck that has a cross-sectional area that approximates a cross-sectional area of the porous region.

32. The device of claim 28, further comprising a conductive layer formed on the planar emission surface.

33. The device of claim 32, wherein the conductive layer has a thickness of approximately 10 nanometers or less.

34. The device of claim 32, wherein the conductive layer comprises multiple metal layers.

35. The device of claim 28, further comprising focusing structures that focus electron beams emitted from the electron emitters.

* * * * *